(12) United States Patent  
Bonerb

(10) Patent No.: US 6,186,713 B1  
(45) Date of Patent: *Feb. 13, 2001

(54) BULK LIQUID FREIGHT TRANSPORT VEHICLE

(75) Inventor: Vincent C. Bonerb, Boston, NY (US)

(73) Assignee: Bulk Systems International, LLC, Blasdell, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/004,345

(22) Filed: Jan. 8, 1998

(51) Int. Cl.[7] ........................................ B60P 7/08
(52) U.S. Cl. .................. 410/100; 410/68; 410/97; 410/98; 220/1.6; 141/314
(58) Field of Search .................. 410/68, 97, 98, 410/99, 100, 103; 220/1.5, 1.6, 495.01, 495.06; 141/114, 314; 248/499; 222/95

(56) References Cited

U.S. PATENT DOCUMENTS

| | | | |
|---|---|---|---|
| 2,372,967 | * | 4/1945 | Martin .................................. 410/97 |
| 2,705,461 | * | 4/1955 | Campbell ............................. 410/97 |
| 3,416,762 | * | 12/1968 | Headrick ........................... 410/97 X |
| 3,510,142 | * | 5/1970 | Erke .................................... 410/68 X |
| 4,497,259 | * | 2/1985 | Titterton ........................... 410/58 X |
| 4,534,596 | | 8/1985 | Bonerb . |
| 4,875,596 | * | 10/1989 | Lohse .................................. 220/1.6 |
| 4,911,317 | * | 3/1990 | Schloesser et al. ................. 220/1.5 |
| 5,188,460 | * | 2/1993 | Dorre .......................... 220/495.06 X |
| 5,402,732 | * | 4/1995 | Erickson et al. ................. 410/54 X |
| 5,437,384 | * | 8/1995 | Farrell ................................. 220/1.5 |
| 5,824,995 | * | 10/1998 | Wise ................................ 220/1.5 X |

* cited by examiner

Primary Examiner—Stephen T. Gordon  
(74) Attorney, Agent, or Firm—Rothwell, Figg, Ernst & Manbeck

(57) ABSTRACT

A freight transport vehicle convertible for carrying piece goods as well as bulk liquid cargo, includes a collapsible liquid cargo bag and at least one adjustable cinching strap for being tightened down over the bag. Tightening of the strap over the bag causes the pressure of the liquid mass within the bag to increase, serving to make the liquid mass act as a solid mass within the bag. This prevents kinetic energy that is built up in the mass through motion of the vehicle from causing sloshing motion of the liquid during transportation, thus eliminating possible hazards in operation of the vehicle and preventing possible damage to the cargo bag.

18 Claims, 8 Drawing Sheets

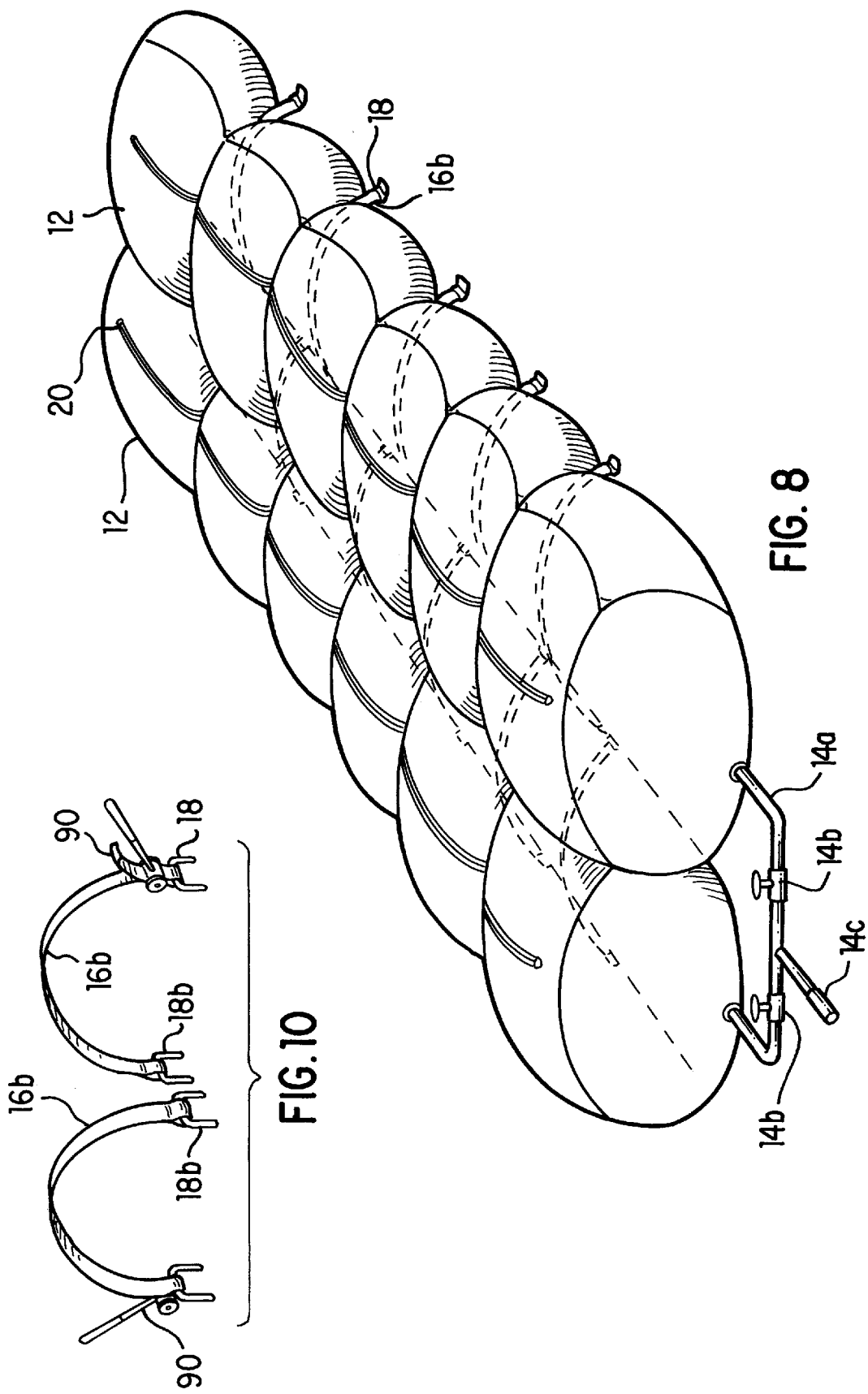

BULK LIQUID FREIGHT TRANSPORT VEHICLE

BACKGROUND OF THE INVENTION

1. Field of the Invention

This invention relates generally to freight vehicles and more particularly to freight vehicles having a cargo space which is capable of handling bulk goods, including bulk liquid product, as well as being capable of handling piece goods, such as boxed or palletized goods.

2. Prior Art

Freight vehicles which can handle either piece goods or bulk goods are generally known. The advantage of such convertibility is that the same cargo space on the same vehicle could handle either of these two significantly different types of loads. The term "piece goods" is defined herein to mean any goods which are handled as individual items or pieces, including packaged goods or palletized goods. The term "bulk goods" means any goods which are pourable and commonly shipped in bulk, such as powder, grain, flake, fluid or liquid materials. The term "freight vehicle" encompasses any vehicle capable of containing freight or cargo, including without limitation tractor-trailers, railway cars, ships, aircraft, domestic and I.S.O. containers, and intermodal freight vehicles.

For example, U.S. Pat. No. 4,534,596, issued Aug. 13, 1985, incorporated in its entirety by reference herein, discloses a freight vehicle having a conventional cargo space for piece goods, wherein the cargo space includes openings in the roof and floor for filling and discharging bulk material. Specially constructed bulk material container bags are deployed from the roof under the inlet openings and extend to the floor over the outlet openings. The bags are filled with bulk material through the inlet openings in the roof, and when the vehicle has arrived at the shipment destination the material is discharged from the outlet openings in the floor. To allow handling of piece goods, the bags are retractable to a stored and locked position on the ceiling of the cargo space.

Freight vehicles also are known which are capable of handling bulk liquid product. In addition to conventional tank trucks, it is known to provide conventional tractor-trailer vehicles with elongated collapsible liquid cargo bags which are adapted to be filled with liquid product. While such liquid cargo bags are secured to the cargo space of the vehicle using various securing means such as harness straps, a major problem in the transportation of bulk liquid product has been the sloshing motion of the bulk liquid during transportation. Such sloshing motion can make the vehicle difficult to control, potentially causing an accident, and additionally, can cause a vehicle to jack-knife or tip over.

The sloshing motion is caused by the kinetic energy that is generated when a large mass traveling at a given speed in a given direction is subjected to a rapid change in speed caused by acceleration or deceleration, or a sudden change in direction caused by the making of a turn. This energy when imparted to the liquid mass can build up over time as the vehicle continues on its route, potentially causing the problems discussed above. There thus exists a need in the art for improvement in systems using such bulk liquid cargo bags in convertible freight transportation vehicles.

SUMMARY OF THE INVENTION

This invention provides a freight vehicle having a cargo space convertible for handling bulk cargo as well as piece goods (general cargo), with an improved system for carrying bulk liquid material, comprising at least one collapsible, flexible liquid cargo bag deployed in the cargo space, for receiving a bulk mass of liquid product to be transported, and at least one adjustable cinch strap mounted across said bag, including a mechanism for tightening the strap down over the bag, so as to increase the pressure of liquid product within the bag such that the liquid mass within the bag acts as a solid mass. The bulk liquid is filled into the liquid cargo bag either by pumping or by gravity loading.

According to another aspect of the invention, a method is provided for carrying bulk liquid material in a freight vehicle including a cargo space convertible from a space suitable for carrying piece goods, comprising the steps of deploying at least one collapsible, flexible liquid cargo bag in the cargo space, for receiving a bulk mass of liquid product to be transported, and increasing the pressure of liquid product loaded within the bag such that the liquid mass within the bag acts as a solid mass.

BRIEF DESCRIPTION OF THE DRAWINGS

The present invention will become more readily understood from the detailed description given hereinafter in conjunction with the accompanying drawings, in which:

FIG. 8 illustrates the system of FIG. 7 after pressurizing;

FIG. 9 is a detailed view of the single-type restrainer belt used in the embodiment of FIGS. 5 and 6; and FIG. 10 is a detailed view of the double-type restrainer belt used the embodiment of FIGS. 7 and 8.

DETAILED DESCRIPTION OF THE PREFERRED EMBODIMENTS

The present invention will now be described in detail with respect to the preferred embodiments as shown in FIGS. 1–10.

Figure 1:
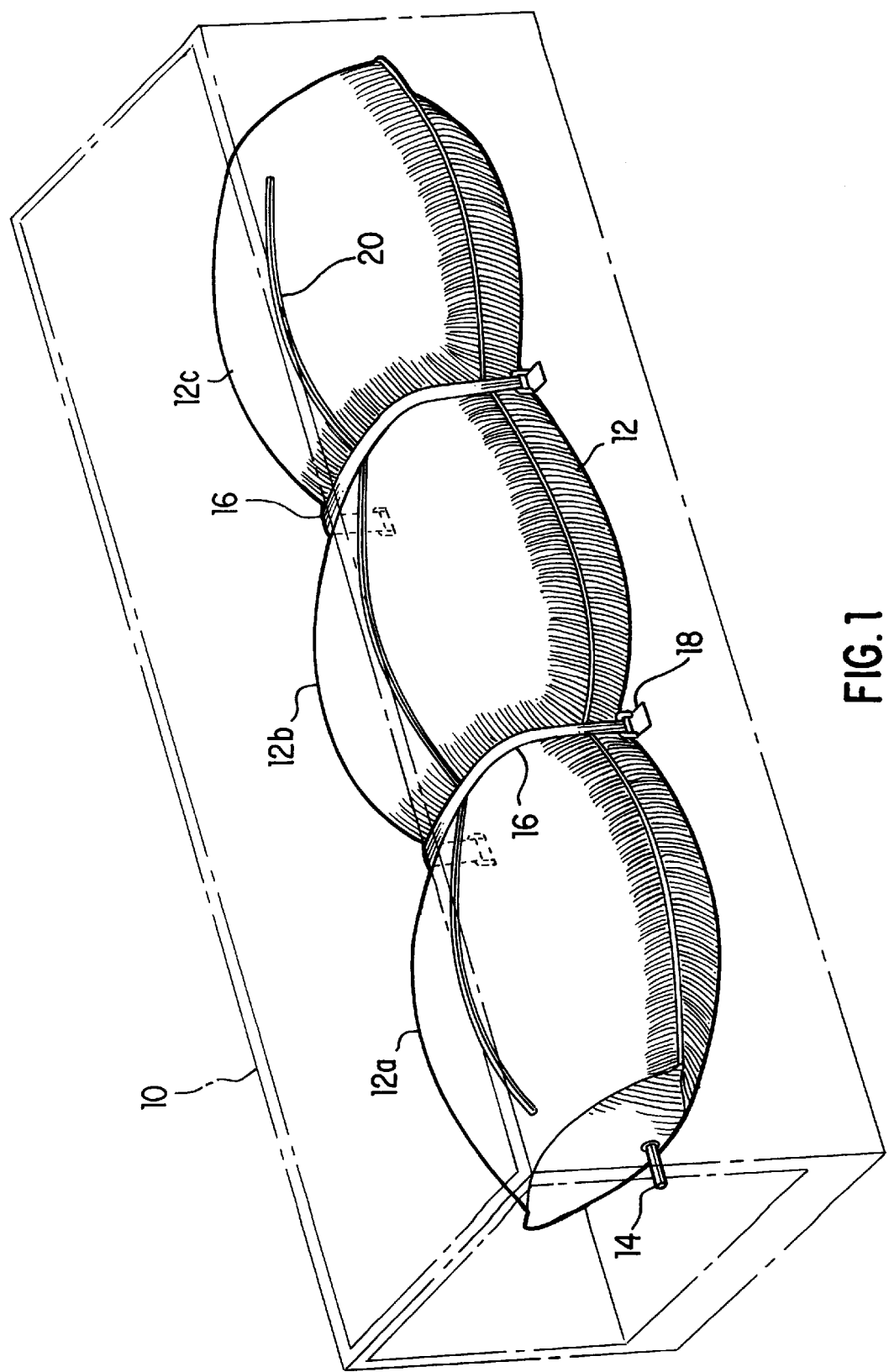
FIG. 1 is a perspective phantom view of a bulk liquid cargo container system according to a first embodiment of the present invention.

As shown in FIG. 1, a bulk liquid cargo bag 12 is provided in a freight transport vehicle 10. Bag 12 is made of a sturdy, lightweight, flexible material. Bag 12 is provided at one end thereof with a fill pipe 14 fitment for filling and draining bulk liquid product from the bag. According to the invention, a plurality of adjustable cinch straps 16 are provided for the purpose of increasing the pressure of the liquid mass within the bag 12, such that the liquid mass will act as a solid within the bag.

The liquid mass is pressurized by tightening the straps 16 down over the bag 12, using a ratcheting mechanism 90, as shown in FIGS. 9 and 10. Straps 16 are preferably attached to the freight vehicle through D-rings 18. However, it is possible that the straps 16 may be belted completely around the bag 12, and additional harness means may be provided to harness the bag to the interior of the cargo space within the freight vehicle.

As shown in the embodiment of FIG. 1, two straps 16 are provided for a bag 12 which is on the order of 40 feet long. The straps 16 divide the bag into three equal sections. When the straps are tightened down to create a sufficient pressure in the liquid mass, they act as baffles, which serve to compartmentalize the bulk liquid into separate sections 12a, 12b and 12c. These separate baffled sections prevent the transfer of the full kinetic forces from one section to another, is and serve to completely stabilize the liquid mass so that it simulates a solid mass. Tests have shown that a pressure of 3 psi was sufficient to cause the liquid mass to take on the characteristics of a solid. However, more or less pressure may be required according to the specific configuration of the bags, the density of the particular liquid product being transported, and other similar factors. This can be accomplished by varying the amount of tightening or cinching down of the straps 16 with respect to the bag 12. A pressure meter may be attached to the bag to allow the pressure to be monitored, thus avoiding the possibility of over- or under-pressurizing the liquid mass.

In a preferred embodiment, the bag 12 may be constructed of a heavy duty, sturdy material, combined with a thinner disposable liner. The disposable liner (not shown) may be removably installed within the bag 12 through a zippered slit 20 along the length of the bag 12. A special use leak proof, high strength zipper with disappearing teeth (commercially known) is used to close the bag. The disposable liner is removed after product discharge, and a new liner is installed before additional product is loaded into the bag. However, it is also possible according to the invention to provide a bag without a liner. Under such circumstances, it is necessary for the bag to be thoroughly cleaned before and after product loading and discharging has been performed. Such a reusable bag is constructed of FDA and Milk Industry approved flexible fabrics, with food-grade approved fitments. After unloading, the zipper is fully opened to allow the fabric to be completed washed with spinners and scrubbers, or to be commercially laundered and passed through a radiation unit to ensure sterility for the next use. Alternatively the zipper can be omitted, in which case both ends of the bag can be opened to permit the bag to be turned inside out for cleaning.

Especially where the transported product is food or plastic grade material, it is absolutely necessary to prevent adulteration or contamination. Incompatibility of many bulk products (liquid or dry) usually limits many transport vehicles to the carriage of a single commodity. Even with the use of expensive controlled cleaning systems available at approved cleaning sites, the danger of contamination still exists because of the configuration of bulk tankers. Moreover, temperature differentials between the hot water and/or steam used for cleaning and the ambient environmental temperature can result in unwanted condensation on the inside of the cargo container. Additionally, there exists potential harm or even death to personnel required to enter a tanker to perform cleaning. The use of the present invention, especially with a disposable liner, effectively eliminates these problems with the prior art.

Figure 2:
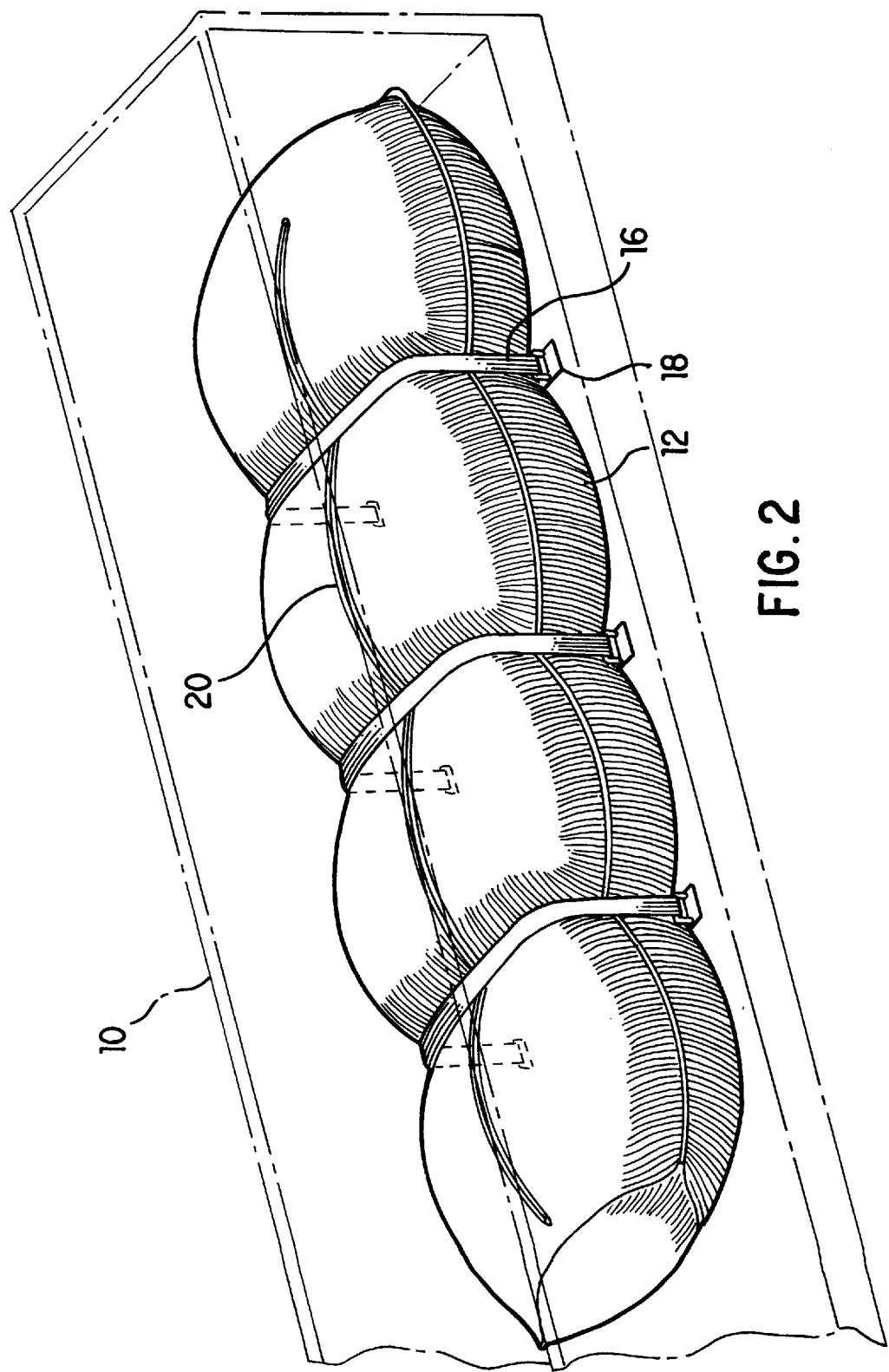
FIG. 2 is a variation of the system of FIG. 1.

Alternatively, as shown in FIG. 2, three straps 16 may be provided to divide the liquid mass into four compartmentalized sections, as needed to stabilize bags of longer length.

Figure 3:
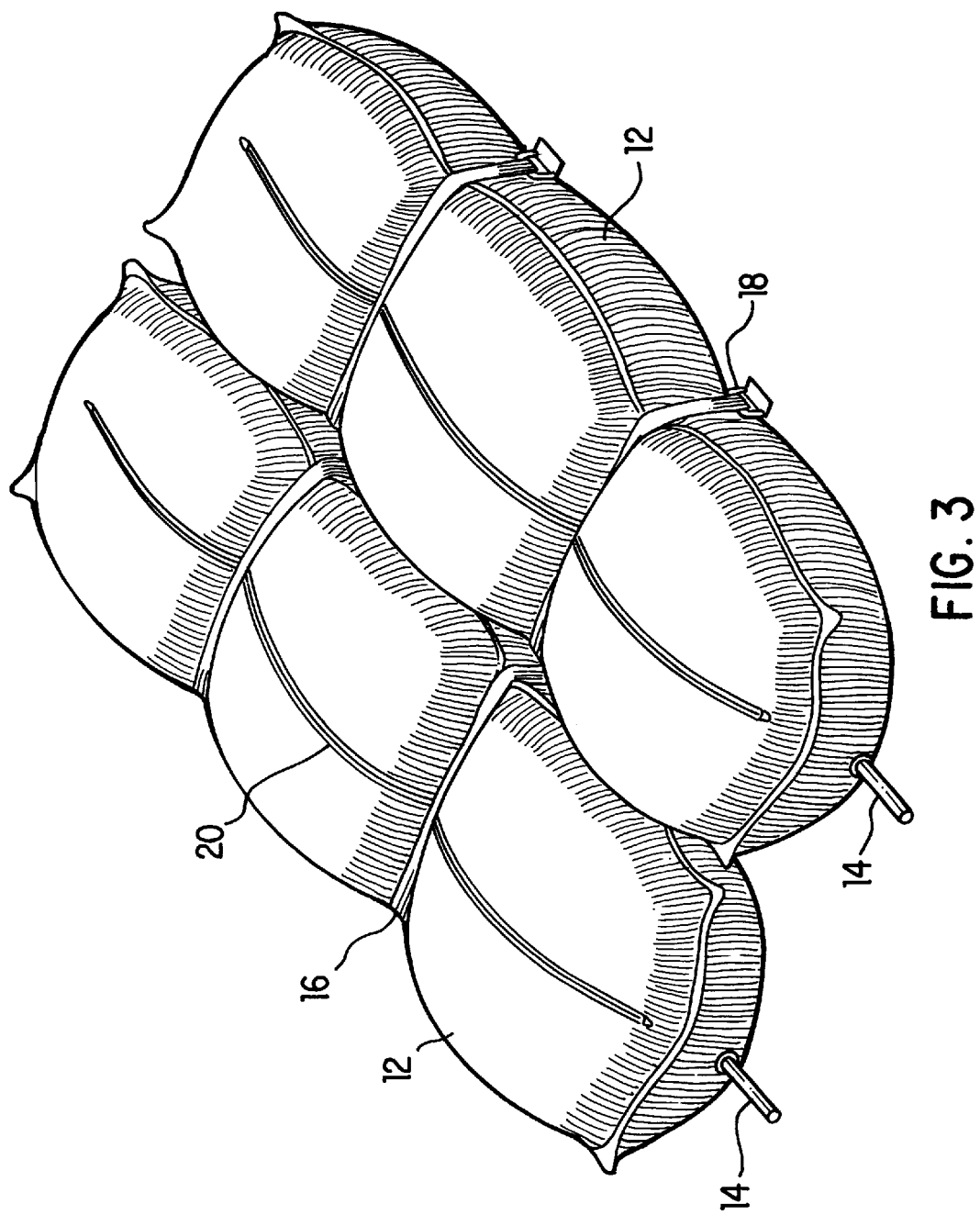
FIG. 3 is a perspective view of a second embodiment of the invention.
Figure 4:
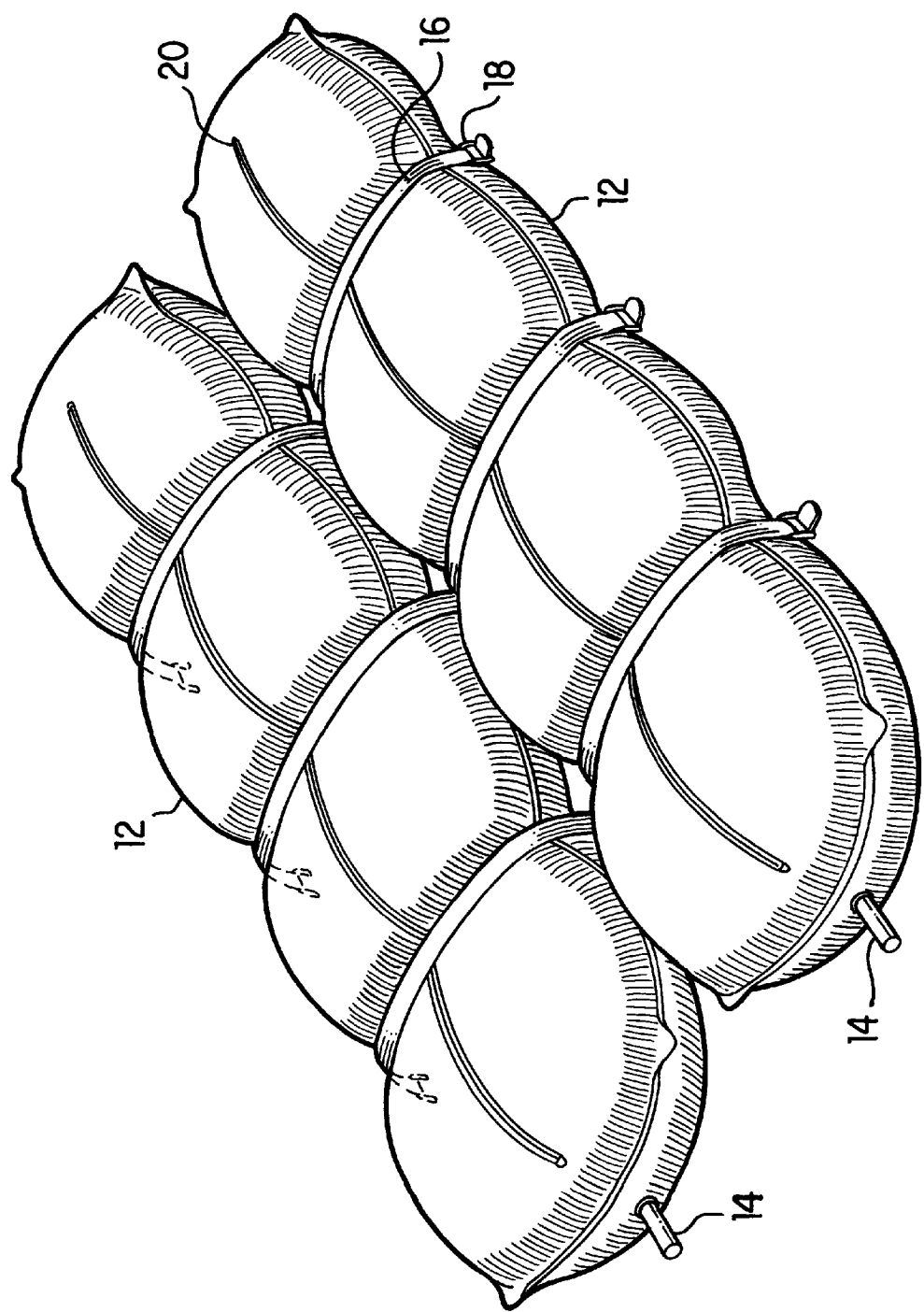
FIG. 4 is a variation of the embodiment of FIG. 3.

FIGS. 3 and 4 illustrate respective alternate embodiments of FIGS. 1 and 2 in which two bags 12 are provided adjacent to each other within the cargo space of a freight vehicle. This embodiment allows the transportation of two different liquid products within the vehicle, or two separate loads of the same product for two separate destinations, while maintaining the solid mass characteristics after the first load has been delivered. Additionally, the provision of two narrower bags 12 will allow greater stabilization of the liquid load than one bag of twice the width.

Figure 5:
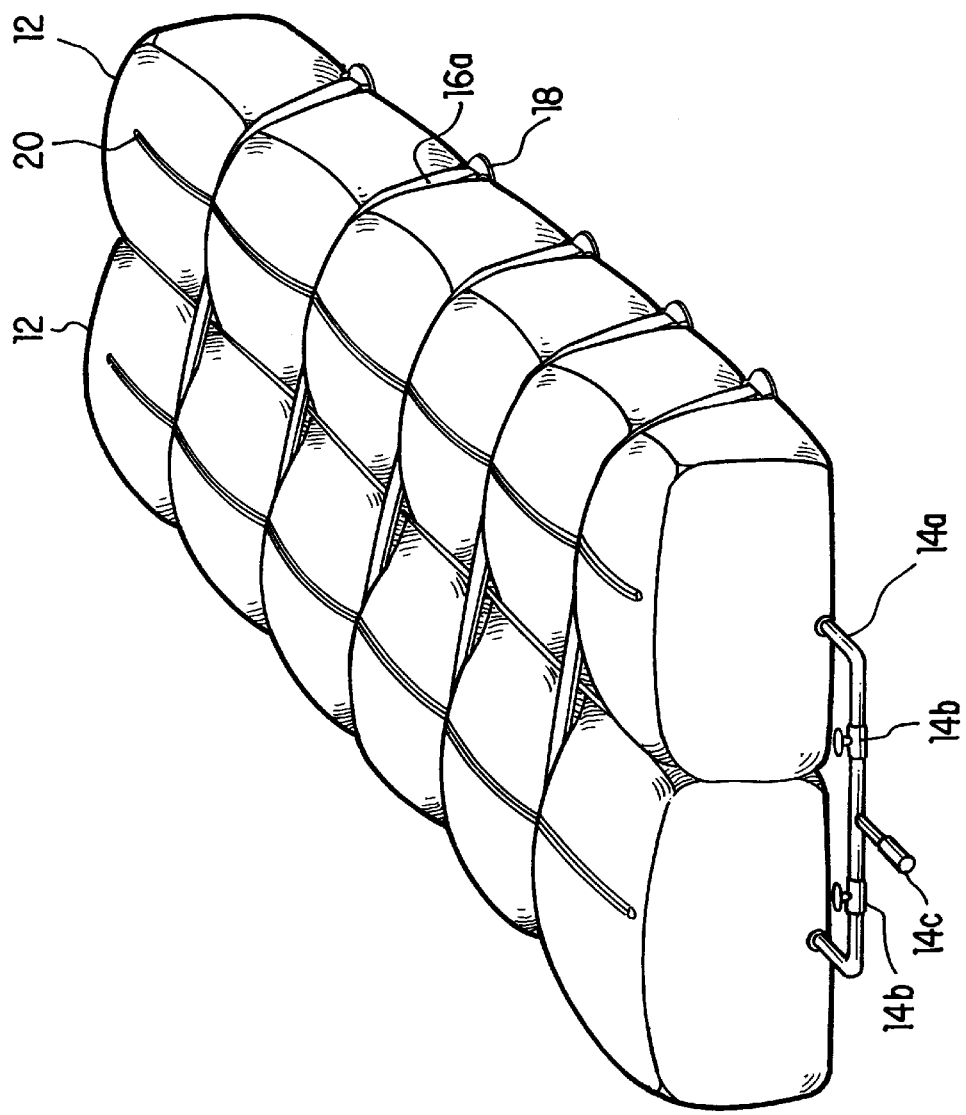
FIG. 5 is a perspective view of a liquid cargo container system before pressurizing, using a single-type restrainer belt.
Figure 6:
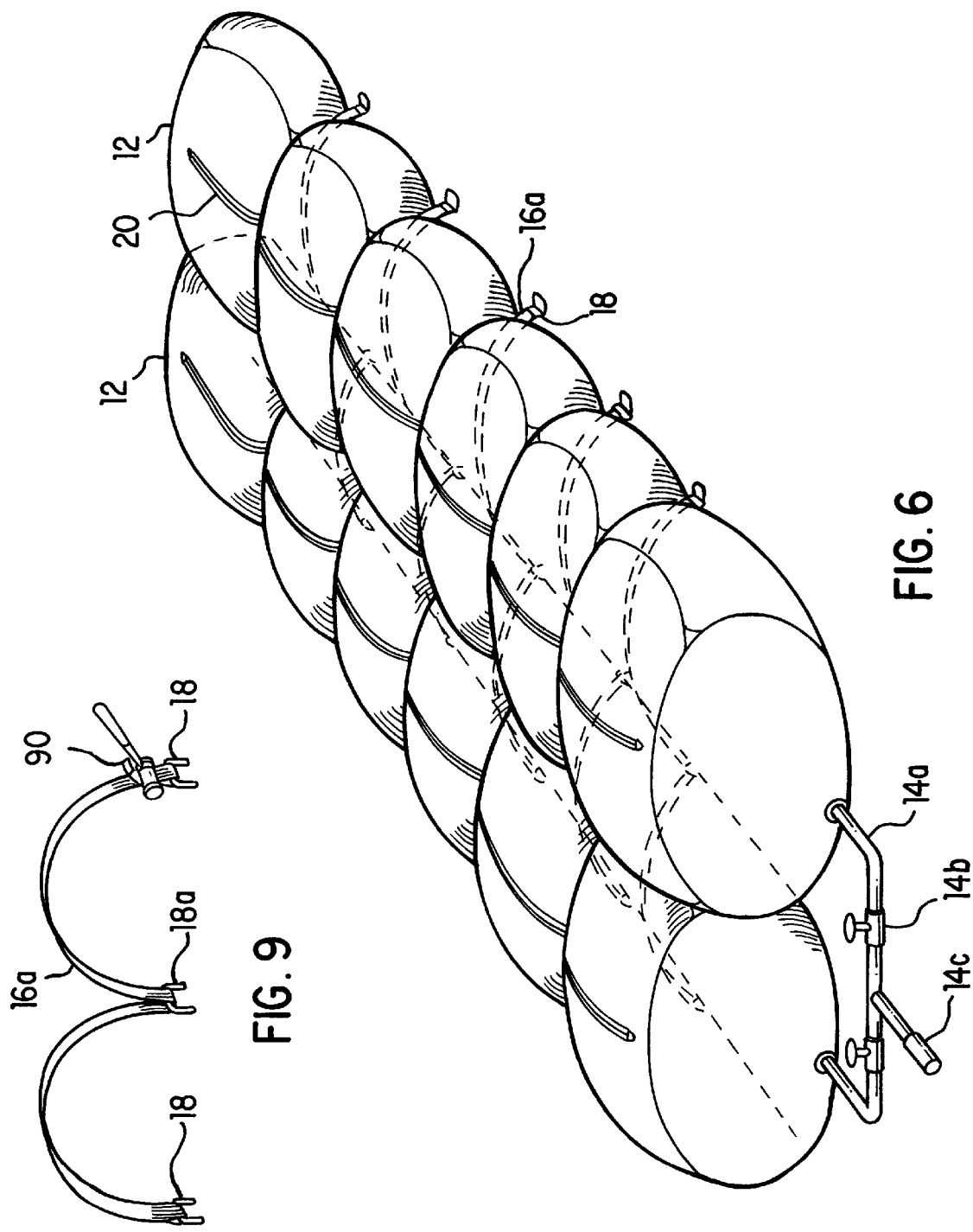
FIG. 6 illustrates the system of FIG. 5 after pressurizing.

FIG. 5 illustrates a further alternate embodiment wherein a double fill pipe 14a is attached to both bags 12. The fill pipe 14a has a single outlet port 14c. Separate valves 14b may be provided for each arm of the fill pipe 14a to control loading and discharge of the liquid product. As shown in FIG. 9, one possible configuration of the cinch straps is a single strap 16a threaded through a D-ring 18a located between bags 12, with a single ratcheting mechanism 90 for tightening the strap down over the bags. FIG. 6 illustrates the bags 12 in a pressurized state after tightening of the straps 16.

FIG. 10 illustrates a second configuration of the cinch straps in which separate straps 16b are attached to separate D-rings 18b mounted in the floor of the cargo space between bags 12.

Figure 7:
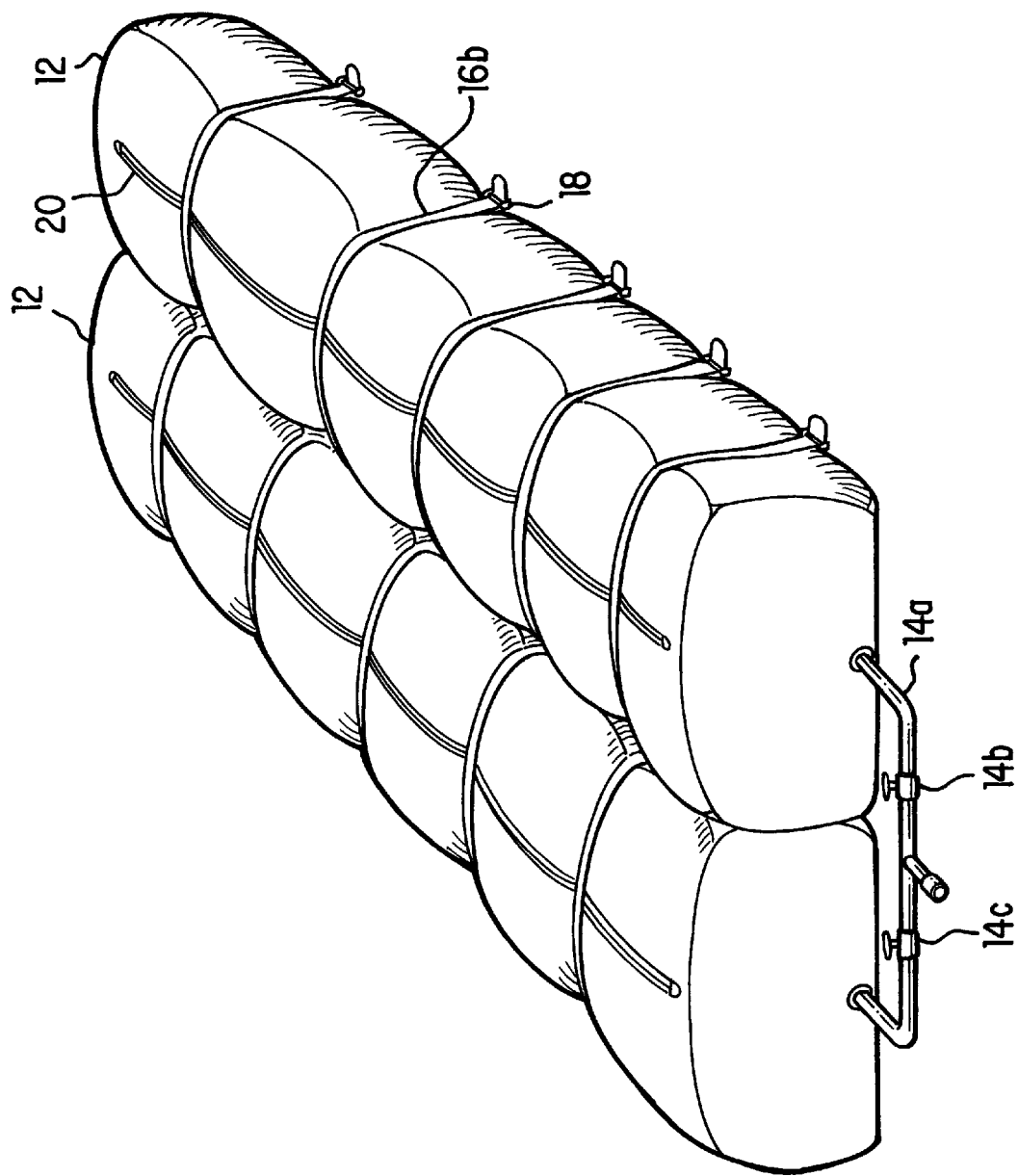
FIG. 7 is a perspective view of a liquid cargo container system before pressurizing, using a double-type restrainer belt.

FIGS. 7 and 8 illustrate an embodiment of the invention using the alternate configuration of the cinch straps as shown in FIG. 10. FIG. 7 illustrates the bags in an unpressurized state, and FIG. 8 shows the bags in a pressurized state after tightening of the straps 16b.

The bags 12 may be collapsed and folded when not in use and stored in a storage compartment built into the floor of the cargo space. Further, air release valves may be provided on the bags to exhaust any air volume present in the bags while loading liquid product into the bags.

The liquid cargo system according to the invention further enables an operator to access the cargo space by providing walking space between the side wall of the vehicle and the loaded liquid cargo bag—facilitating inspection, installation and removal of single or double outer bags, as well as installation and removal of disposable inner liner bags.

The invention having been thus described, it will be apparent to those skilled in the art that the same may be varied in many ways without departing from the spirit and scope of the invention. Any and all such modifications are intended to be covered by the following claims.

What is claimed is:

1. A freight vehicle having a cargo space convertible from a space suitable for carrying piece goods into a space suitable for carrying bulk liquid material, comprising:
    at least one collapsible, flexible liquid cargo bag deployed in said cargo space, for receiving a bulk mass of liquid product to be transported; and
    at least one adjustable cinch strap having two ends, said cinch strap being mounted across said bag, including means for tightening said strap down over said bag, further comprising means for securing both ends of said strap to the interior of said cargo space, said means for tightening operating to increase the pressure of liquid product within said bag such that said liquid mass within said bag acts as a solid mass.

2. A freight vehicle according to claim 1, wherein said liquid cargo bag contains an elongated, closable slit on top of said bag for installation and removal of said bulk liquid mass by gravity loading.

3. A freight vehicle according to claim 1, wherein said securing means comprises a D-ring fastener mounted to the floor of said cargo space.

4. A freight vehicle according to claim 1, wherein said liquid cargo bag contains an elongated, closable slit for installation and removal of a disposable liner.

5. A freight vehicle according to claim 1, wherein said tightening means comprises a ratcheting mechanism.

6. A freight vehicle according to claim 1, further comprising at least one fill pipe provided in said liquid cargo bag for loading and discharging bulk liquid product into and from said bag.

7. A freight vehicle according to claim 6, further comprising a second liquid cargo bag deployed adjacent to said at least one bag, said second bag including a fill pipe, said fill pipes of said at least one bag and said second bag being connected to a common outlet port.

8. A freight vehicle according to claim 4, wherein said closable slit includes a zipper.

9. A method for carrying bulk liquid material in a freight vehicle including a cargo space convertible from a space suitable for carrying piece goods, comprising the steps of:

deploying at least one collapsible, flexible liquid cargo bag in said cargo space, for receiving a bulk mass of liquid product to be transported; and increasing the pressure of liquid product loaded within said bag such that said liquid mass within said bag acts as a solid mass.

10. A method as set forth in claim 9, wherein the step of increasing the pressure comprises the step of mounting at least one adjustable cinch strap across said bag, and tightening said strap down over said bag to increase said pressure.

11. A system for converting a cargo space of a freight vehicle from a space suitable for carrying piece goods into a space suitable for carrying bulk liquid material, comprising:

at least one collapsible, flexible liquid cargo bag deployed in said cargo space, for receiving a bulk mass of liquid product to be transported; and at least one adjustable cinch strap having two ends, said cinch strap being mounted across said bag, including means for tightening said strap down over said bag, including means for securing said strap at both ends to the interior of said cargo space, said means for tightening operating to increase the pressure of liquid product within said bag such that said liquid mass within said bag acts as a solid mass.

12. A system according to claim 11, wherein said securing means comprises a D-ring fastener mounted to the floor of said cargo space.

13. A system according to claim 11, wherein said liquid cargo bag contains an elongated, closable slit for installation and removal of a disposable liner.

14. A system according to claim 11, wherein said tightening means comprises a ratcheting mechanism.

15. A system according to claim 11, further comprising at least one fill pipe provided in said liquid cargo bag for loading and discharging bulk liquid product into and from said bag.

16. A system according to claim 15, further comprising a second liquid cargo bag deployed adjacent to said at least one bag, said second bag including a fill pipe, said fill pipes of said at least one bag and said second bag being connected to a common outlet port.

17. A system according to claim 13, wherein said closable slit includes a zipper.

18. A method for carrying bulk liquid material in a freight vehicle including a cargo space convertible from a space suitable for carrying piece goods, comprising the steps of:

deploying at least one collapsible, flexible liquid cargo bag in said cargo space, for receiving a bulk mass of liquid product to be transported;

mounting at least one adjustable cinch strap across said bag, said cinch strap having two ends and including means for tightening said strap down over said bag, further including means for securing said cinch strap at both ends to the interior of said cargo space; and increasing the pressure of liquid product loaded within said bag by tightening said cinch strap such that said liquid mass within said bag acts as a solid mass.

\* \* \* \* \*